(12) United States Patent
Shamah

(10) Patent No.: US 7,281,731 B2
(45) Date of Patent: Oct. 16, 2007

(54) COLLAPSIBLE FOLDING UTILITY CART

(76) Inventor: Haim Shamah, 5902 Sumter Ave., Myrtle Beach, SC (US) 29577

( * ) Notice: Subject to any disclaimer, the term of this patent is extended or adjusted under 35 U.S.C. 154(b) by 375 days.

(21) Appl. No.: 10/933,937

(22) Filed: Sep. 3, 2004

(65) Prior Publication Data

US 2006/0049614 A1   Mar. 9, 2006

(51) Int. Cl.
*B62B 1/12* (2006.01)
(52) U.S. Cl. .................. 280/639; 280/654; 280/DIG. 3
(58) Field of Classification Search ................ 280/638, 280/35, 639, 38, 39, 40, 642, 643, 645, 646, 280/42, 647, 648, 649, 652, 654, 655, DIG. 3
See application file for complete search history.

(56) References Cited

U.S. PATENT DOCUMENTS

| | | | |
|---|---|---|---|
| 1,769,418 A | | 7/1930 | Cooper et al. |
| 2,421,751 A | | 6/1947 | Giordano |
| 3,390,893 A | * | 7/1968 | Maclaren ...................... 280/39 |
| 4,030,769 A | * | 6/1977 | Peng et al. .................... 280/42 |
| 4,118,052 A | * | 10/1978 | Cabagnero .................. 280/642 |
| 4,369,987 A | | 1/1983 | Witherell |
| 4,398,748 A | | 8/1983 | Duvignacq |
| 4,640,519 A | * | 2/1987 | Bigo ........................... 280/42 |
| 4,844,504 A | | 7/1989 | Bigo |
| 5,288,098 A | * | 2/1994 | Shamie ........................ 280/642 |
| 5,755,455 A | * | 5/1998 | Chen et al. .................. 280/642 |
| 5,845,925 A | * | 12/1998 | Huang .......................... 280/642 |
| 5,915,722 A | | 6/1999 | Thrasher et al. |
| 5,988,671 A | | 11/1999 | Abelbeck et al. |
| 6,105,997 A | | 8/2000 | Watkins |
| 6,113,128 A | * | 9/2000 | Watkins ....................... 280/647 |
| 6,206,405 B1 | | 3/2001 | Watkins |
| 6,354,619 B1 | * | 3/2002 | Kim ............................. 280/651 |
| 6,386,575 B1 | | 5/2002 | Turner |
| 6,443,480 B1 | * | 9/2002 | Wu ............................. 280/649 |
| 6,598,898 B2 | | 7/2003 | Chu |
| 6,843,499 B2 | * | 1/2005 | Guo ............................ 280/642 |
| 6,877,762 B2 | * | 4/2005 | Yamazaki .................... 280/647 |
| 2002/0171227 A1 | * | 11/2002 | Eguchi et al. .............. 280/650 |

\* cited by examiner

*Primary Examiner*—Christopher P. Ellis
*Assistant Examiner*—John D Walters
(74) *Attorney, Agent, or Firm*—McNair Law Firm, P.A.; Seann P. Lahey

(57) ABSTRACT

The improved collapsible utility cart of the present invention includes a frame and a container carried by the frame. The frame includes a pair of elongated handle frame members which are oppositely disposed and interconnected, a pair of oppositely disposed wheel carrying frame members, pivotally dependent from the handle carrying frame members, and a pair of interconnected and forwardly facing container support frame members which are oppositely disposed from each other. Front and rear connectors are disposed respectively between the container support frame members and the handle carrying frame members to provide respective support for a container to be carried by the frame. A horizontally disposed parallelogramic linkage is connected to and disposed between the handle carrying frame members and the wheel carrying frame members to permit collapsible lateral movement of the frame and to support the bottom portion of the container.

40 Claims, 14 Drawing Sheets

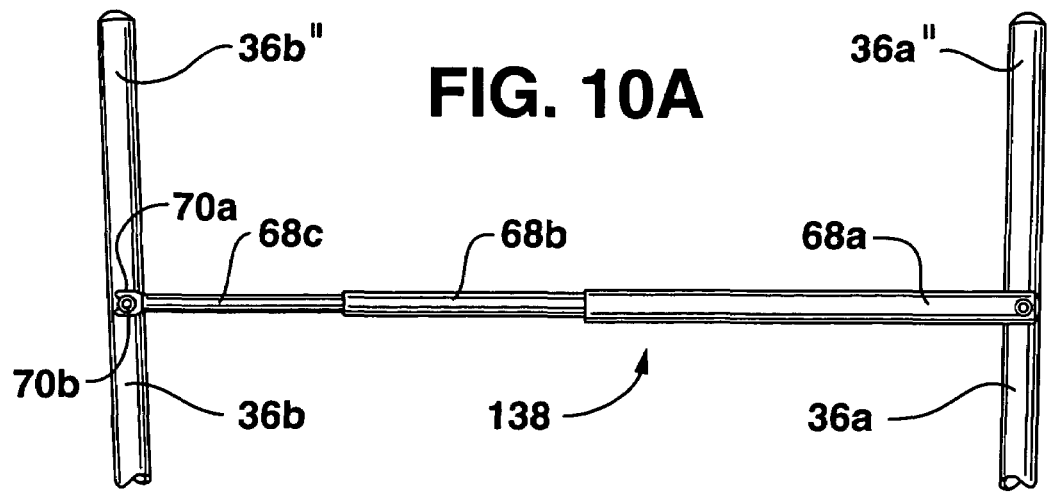
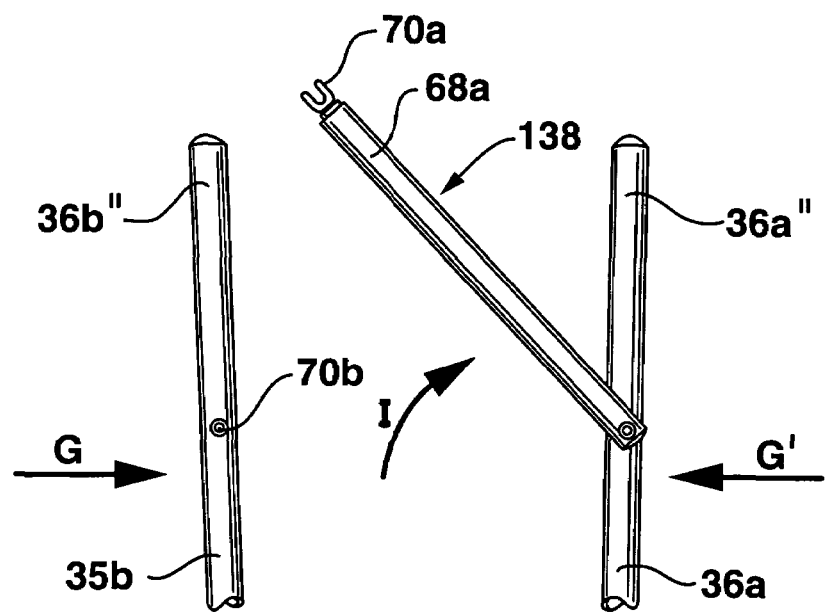

COLLAPSIBLE FOLDING UTILITY CART

BACKGROUND OF THE INVENTION

The present invention is directed generally to utility carts, and more specifically to collapsible and/or foldable utility carts, and yet additionally to utility carts which are foldable in the lateral dimension (i.e., the width of the cart), which may be useful among many other applications for transporting items typically for use at the beach, for shopping, etc.

A wide variety of prior art may be found with regard to different forms of utility carts, hand carts and other apparatus for transporting items, inter alia, to the beach and/or for shopping, for example. However, these prior art structures may be lacking in optimal utility and/or functionality. In particular, U.S. Pat. Nos. 6,598,898 and 1,769,418 disclose folding carts capable of carrying a variety of items, and in different environments. However, the taught structural arrangement of the frame members for these carts does not allow the cart to be folded in such a manner that the width of the cart is reduced when in a folded or storage arrangement.

U.S. Pat. No. 2,422,751 discloses a collapsible shopping cart in which the frame members are adapted to allow the side frame members to collapse inwardly towards each other to reduce the overall width of the cart when in the folded configuration. However, the arrangement of the frame members is not optimal, in that there is no structure (e.g., a pair of lower frame members arranged in an X-shaped manner) which interconnects the front and rear legs to provide stability and rigidity to the support frame. Nor is there any structure to provide a substantial platform for supporting carried items directly on the frame members as disposed within the carrying basket.

U.S. Pat. Nos. 5,988,671 and 5,915,722 disclose various other forms of collapsible carts. However, although these carts may provide a certain carrying capacity, an adequate collapsibility or foldability feature is lacking. Specifically, the respective teachings regarding the disposition of the frame members do not permit for the side frame members to be collapsed inwardly towards each other to reduce the width of the cart when in a folded configuration.

In summary, none of the above cited patents shows or discloses a folding utility cart which includes various frame members adapted to collapse in a manner which (a) reduces the width (e.g., the lateral dimension) between the side frame members when in a folded configuration, and which (b) provides support for a mesh basket, as well as (c) to provide the ability to support relatively large items directly upon or substantially carried by a pair of preferably X-shaped lower frame members, such as for example a parallelogramic linkage.

Accordingly, and in view of the developed prior art, it is a material object of the improved collapsible utility cart of the present invention to substantially alleviate the defects, deficiencies and/or disadvantages of these and other prior art structures and methods.

SUMMARY OF THE INVENTION

The improved collapsible utility cart of the present invention includes in preferred embodiments a frame and a container carried by the frame.

The frame, which preferably may be a tubular frame, includes a pair of elongated handle frame members which are oppositely disposed and interconnected. Secondly, the frame includes a pair of oppositely disposed wheel carrying frame members, and which are respectively pivotally dependent from the handle carrying frame members. Thirdly, the frame further includes a pair of interconnected and forwardly facing container support frame members, which are oppositely disposed from each other. Such container supporting frame members are likewise pivotally dependant from the handle carrying frame members. Additionally, front and rear connectors are disposed respectively between the container support frame members and the handle carrying frame members to provide support for a container to be carried by the frame. Specifically, in preferred embodiments the weight of the front portion of the container is carried principally by the front connector, and the weight of the rear portion of the container is carried principally by the rear connector.

A first (or primary) parallelogramic linkage is connected to and disposed in a substantially horizontal extending plane disposed between and carried by the handle carrying frame members and the wheel carrying frame members thereby to permit collapsible lateral movement (i.e., reduction of the width) of the frame, and thus to decrease materially the lateral dimension or width of the frame from a load carrying first position to a folded second position, such as for transportation of the utility cart of the present invention. Additionally, wheels are connected to the wheel carrying frame members at a distal portion thereof for transportation of the cart.

Additional features of the improved collapsible utility cart of the present invention are set forth hereinbelow and will become more apparent to those skilled in the art upon review of the following description of the drawings, description of preferred embodiments, the appended claims, and attached Drawing.

BRIEF DESCRIPTION OF THE DRAWING

The features of certain preferred embodiments of the improved collapsible utility cart of the present invention will be hereinafter described in reference to the accompanying drawing showing certain exemplary embodiments, thereof, and wherein:

FIG. 10A is an enlarged front view of an alternative embodiment of a front connector showing telescopingly disposed bar elements thereof as disposed between the pair of container front support frame members;

FIG. 10B is a front view of the front connector embodiment of FIG. 10A, showing the hingedly connected telescoping front connector embodiment of FIG. 10A, and comprising telescopingly disposed and transversely extending support bar members including a locking latch mechanism thereof for holding the utility cart in its fully laterally extended and operative position;

DESCRIPTION OF PREFERRED AND ALTERNATIVE EMBODIMENTS

Figure 1:
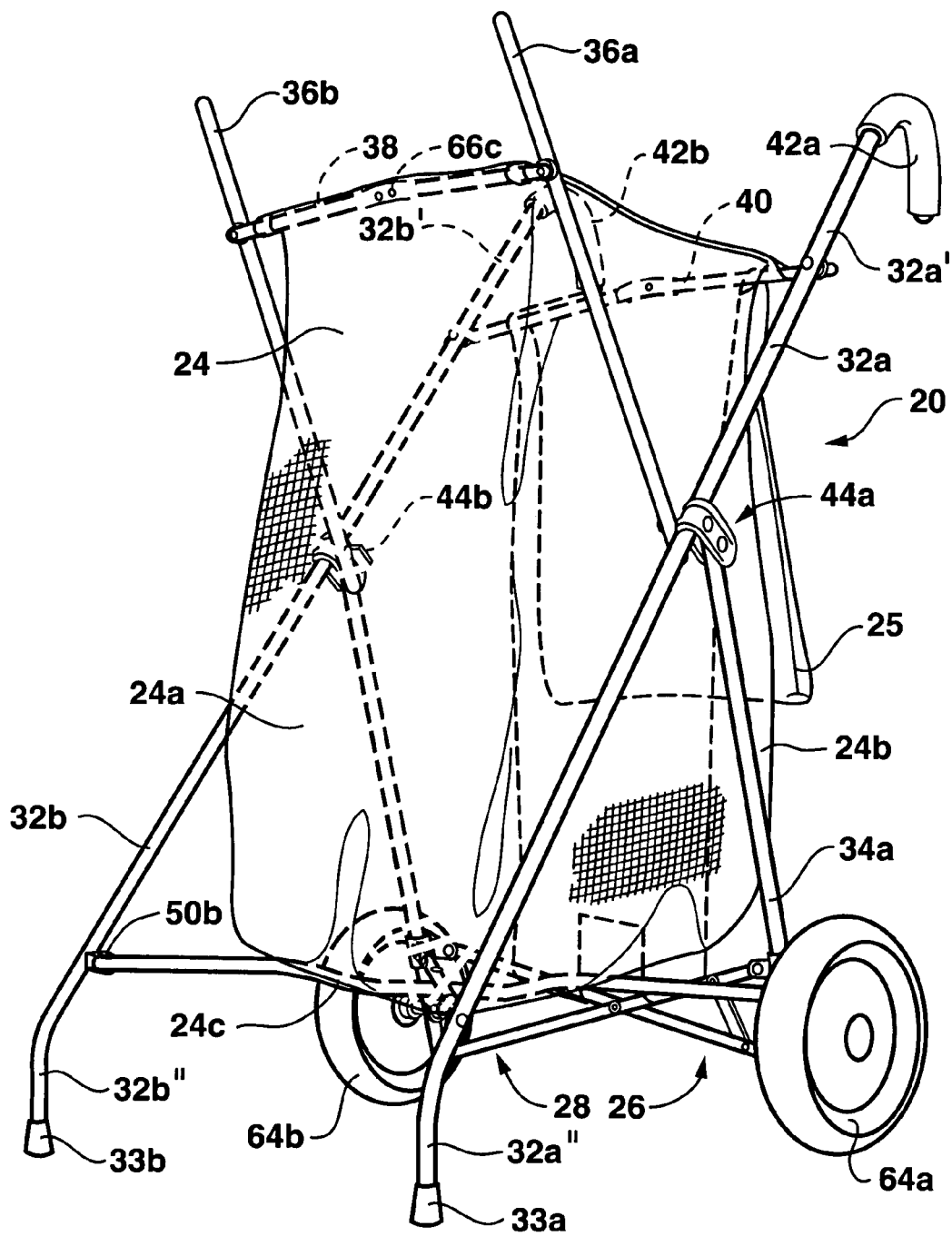
FIG. 1 is a front perspective view of the improved collapsible utility cart of the present invention, generally showing the frame, vertical and horizontal parallelogramic linkages, container, wheels, front stopper, and handle features thereof.
Figure 13:
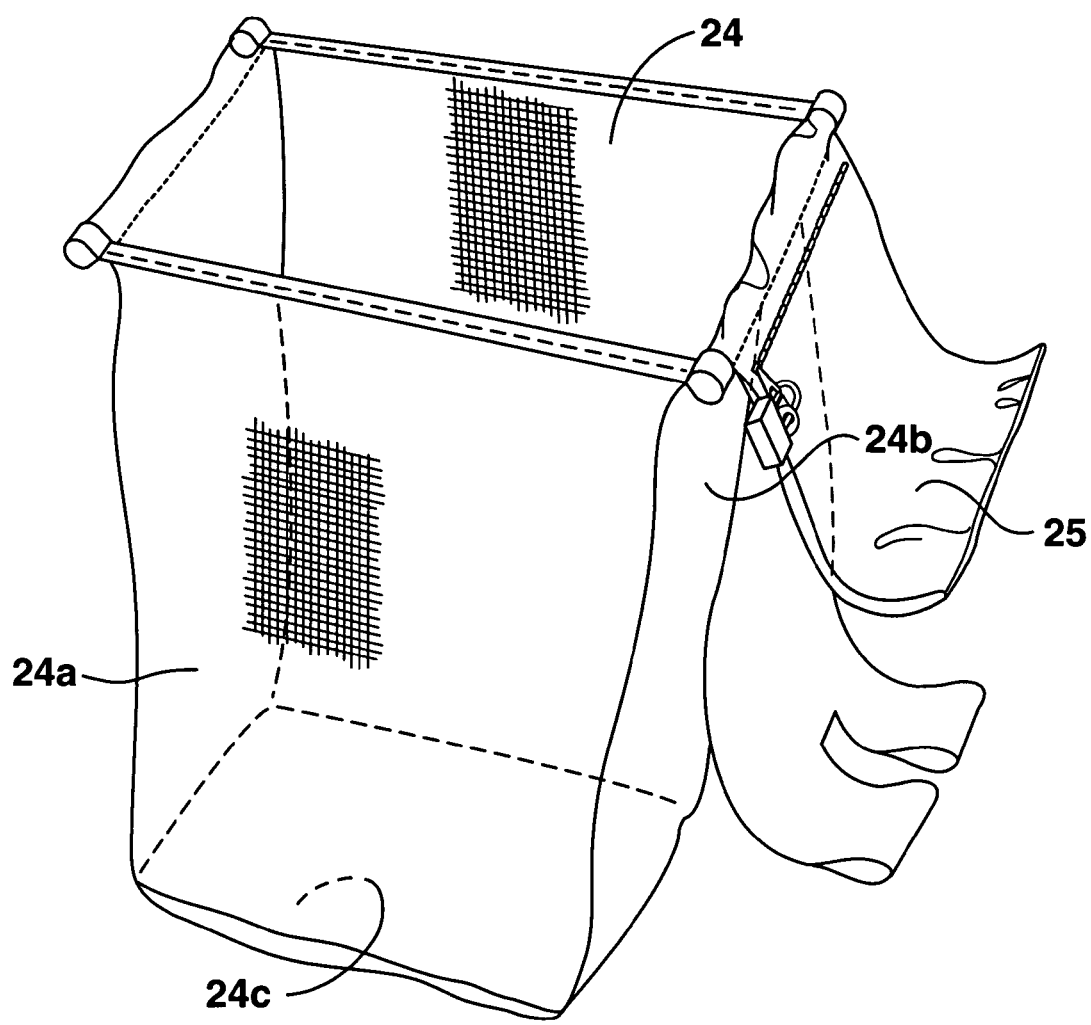
FIG. 13 is a perspective view showing the details of the container, together with the zipper pouch, as carried by the front connector and the rear connector, as shown in FIG. 1, for example.

Referring now in more detail to the drawing and to FIG. 1 thereof in particular, one preferred embodiment of the improved collapsible utility cart of the present invention, generally designated as 20, is shown. The improved collapsible utility cart 20 in preferred embodiments includes a frame, generally 22, and a container, generally 24. The container 24 in preferred embodiments includes a front portion 24a, a rear portion 24b, and a bottom portion 24c, and may in preferred embodiments be accompanied by an associated zippered bag 25, as shown in FIGS. 1 and 13.

As shown also in FIGS. 1, 2, 4, 5, 6 and 7, as described in greater detail, infra, frame 22 includes a first or primary parallelogramic linkage generally 28, which is disposed substantially horizontally in preferred embodiments. In additional preferred embodiments, a second, or secondary parallelogramic linkage generally 26, is disposed preferably in the vertical dimension to provide yet additional stability and rigidity when utility cart 20 is in the load carrying or extended position.

In a preferred embodiment of the improved collapsible utility cart 20 of the present invention, frame 22 includes elongated handle carrying frame members 32a, 32b, wheel carrying frame members 34a, 34b, and container support frame members 36a, 36b, each of which is described as to structure and function in greater detail hereinbelow. Yet, additionally, a front connector 38 and a rear connector 40 are disposed respectively between and for interconnecting the container support frame members 36a, 36b and the handle carrying frame members 32a, 32b. Each of the front and rear connector members 38, 40 is also described in greater detail hereinbelow with respect to one or more preferred embodiments.

In particular, as to some preferred structures of the present invention, and as shown in the Figures hereof, a pair of oppositely disposed, interconnected and elongated handle carrying frame members 32a, 32b are provided. The handle carrying frame members 32a, 32b have respective proximal end portions 32a', 32b' and distal end portions 32a", 32b". The proximal end portions 32a', 32b' of the handle carrying frame members 32a, 32b are adapted in some preferred embodiments to include respective handles 42a, 42b. Said handles 42a, 42b may be integrally formed upon handle carrying frame members 32a, 32b as a part thereof, or may constitute in same embodiments separate parts.

The oppositely disposed wheel carrying frame members 34a, 34b are respectively pivotally and downwardly dependent (see Arrows A and B of FIG. 3A) from the handle carrying frame members 32a, 32b, as shown in FIGS. 1-3A. The wheel carrying frame members 32a, 32b include respective proximal portions 32a', 32b' and distal portions 32a", 32b".

As noted, supra, improved collapsible utility cart 20 of the present invention in some preferred embodiments further includes a pair of interconnected and forwardly facing container support members 36a, 36b that are oppositely disposed, shown in FIGS. 1, 2, 3, 10, 11 and 12. Each of the container support frame members 36a, 36b is pivotally dependent (see Arrows A and B, supra) from respective handle carrying frame members 32a, 32b (also see Arrow A in FIG. 8). The container support frame members 36a, 36b have respective proximal portions 36a', 36b' and distal portions 36a", 36b".

Figure 7:
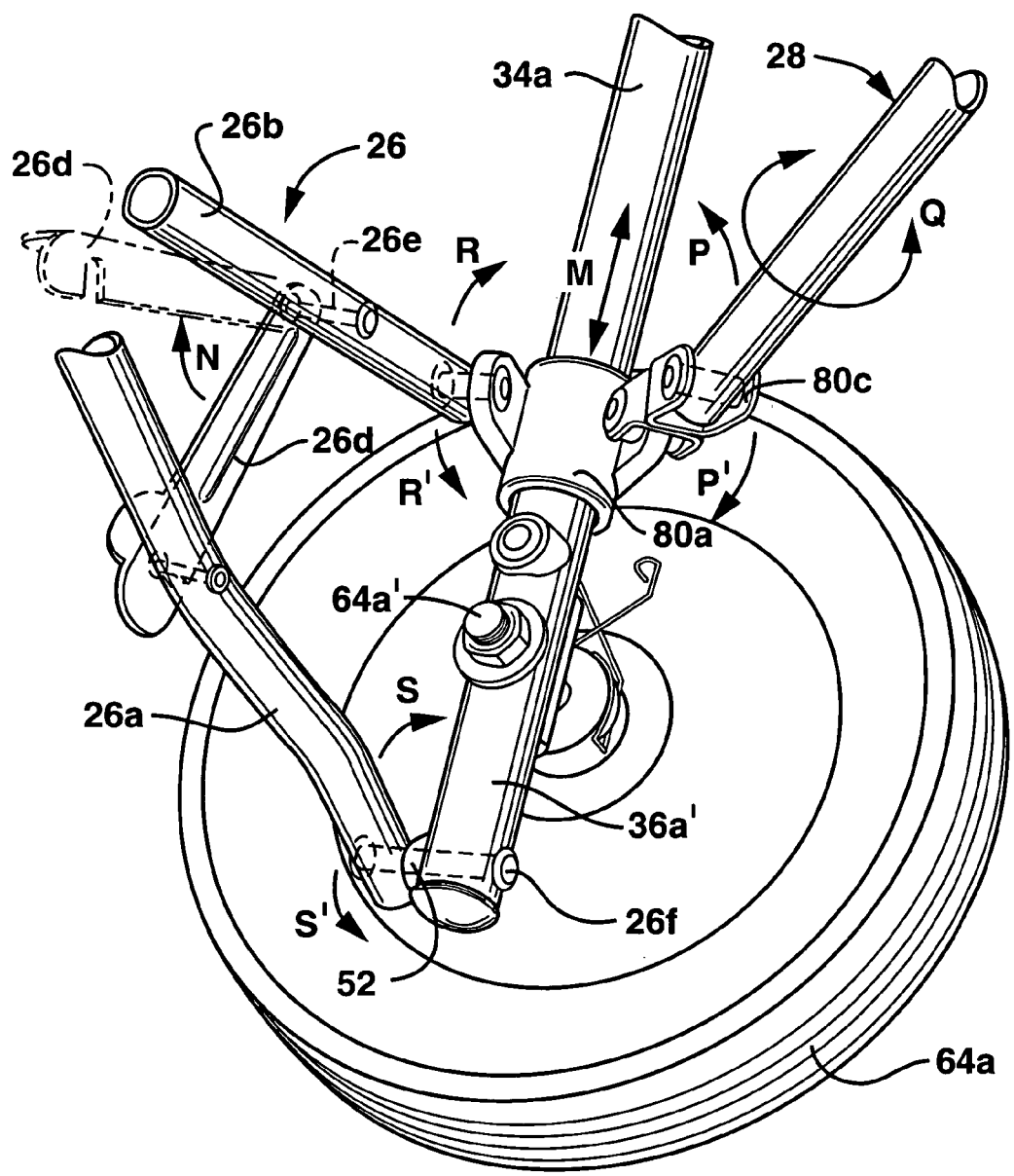
FIG. 7 is a yet further greatly enlarged view of the inside and connecting structure of a wheel structure, together with the functionality of the bracket interconnecting the vertical and horizontal parallelogramic linkages, and as detailing further the structures of FIGS. 5 and 6.
Figure 8:
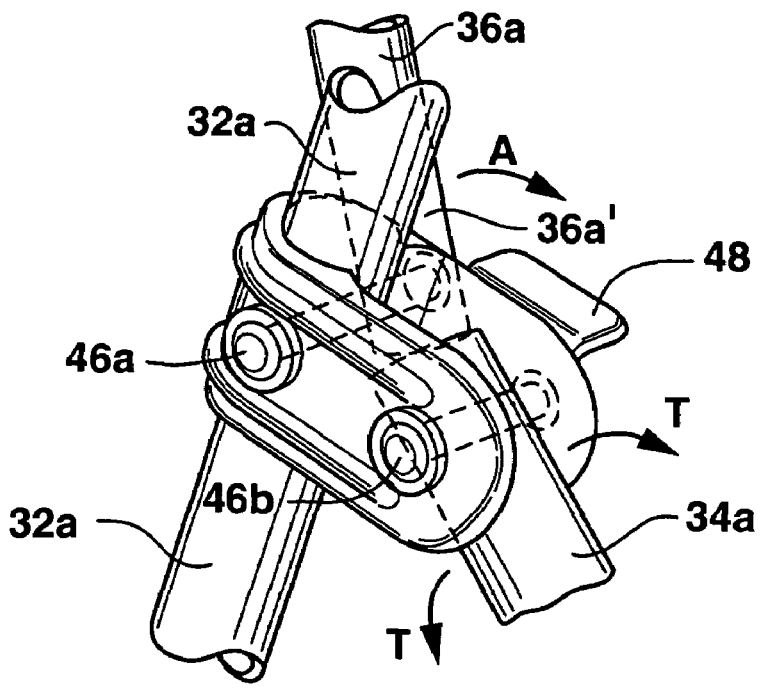
FIG. 8 is a greatly enlarged view of one of the paired connector brackets holding and pivotally interconnecting a respective handle carrying frame member, a wheel carrying frame member and a container support frame member.

FIG. 8 shows one (44a) of connector brackets, generally 44a, 44b (as likewise shown in FIGS. 1-7), which hold and pivotally interconnect a handle carrying frame member 32a, with a wheel carrying frame member 34a and also with a container support frame member 36a, by means of pins 46a, 46b, and may preferably include a thumb flange 48 for folding operation thereof. Of course, connector brackets 44a, 44b are disposed on each lateral side of utility cart 20 for the purpose of interconnecting these frame elements. Wheel carrying frame member 34a is hingably disposed (at Arrows T, T) from handle connecting frame member 32a.

Figure 2:
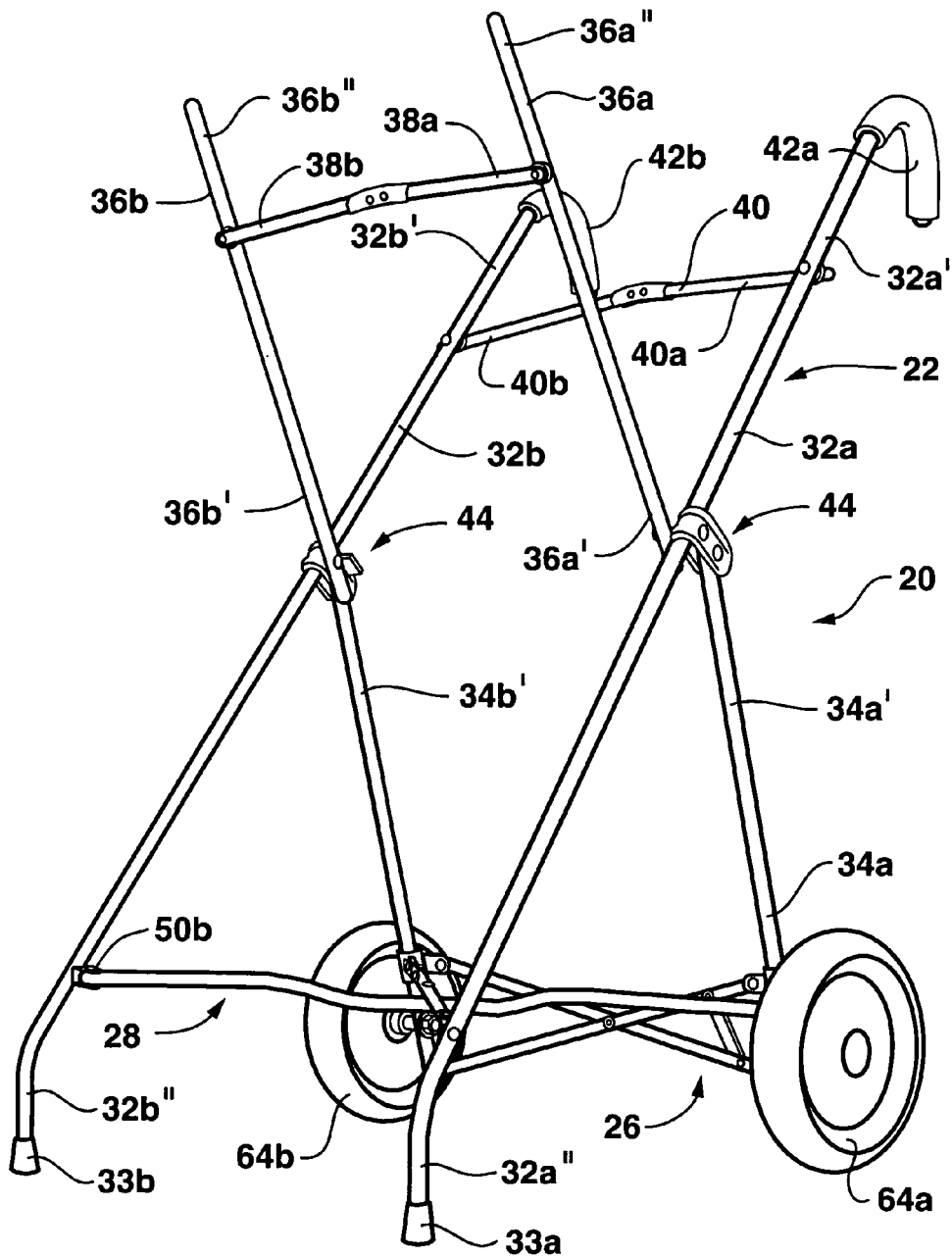
FIG. 2 is a front perspective view of the improved collapsible utility cart of the present invention showing the frame, parallelogramic linkages, wheels, front stopper and handle features thereof, with the container portion thereof removed.
Figure 3A:
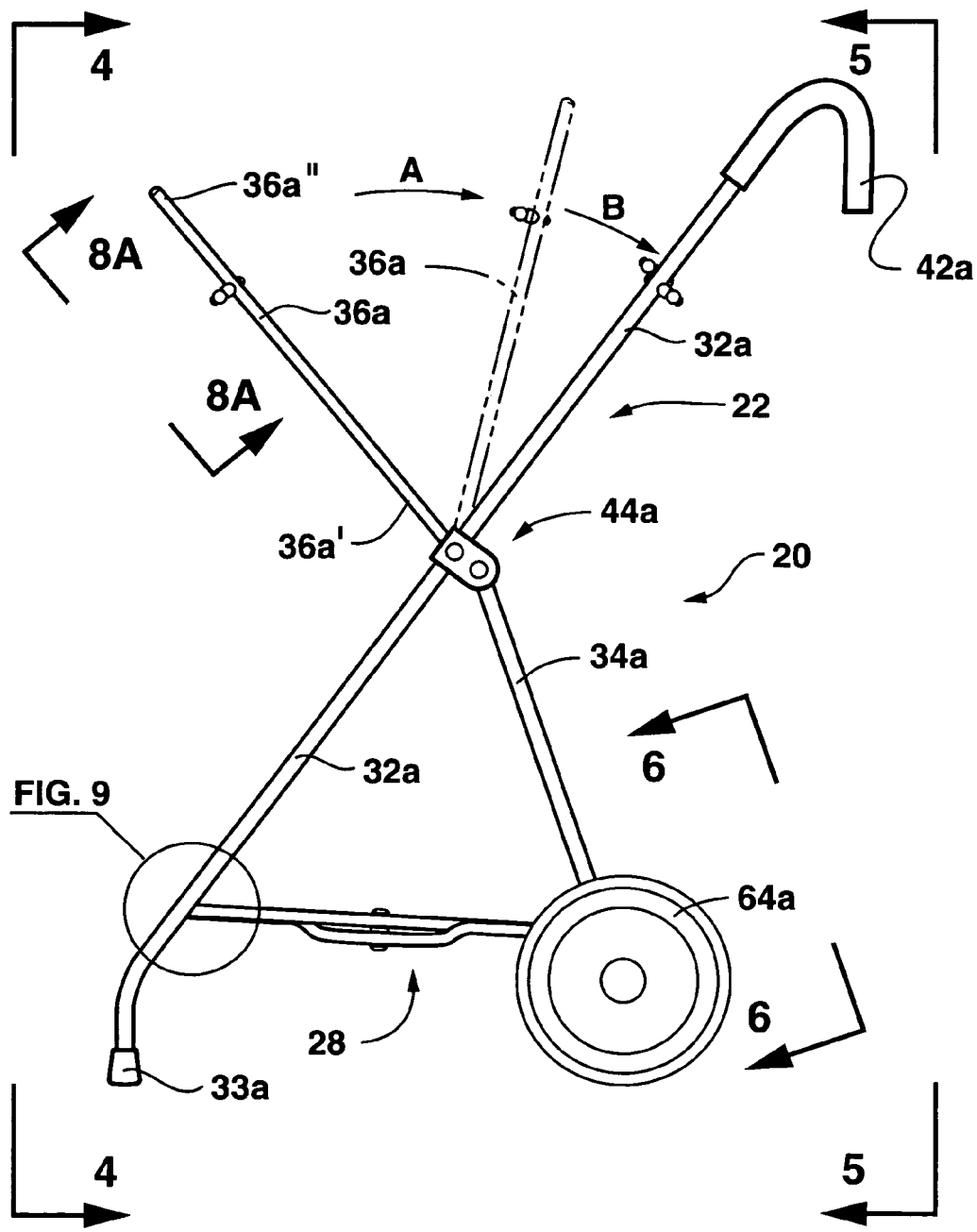
FIG. 3A is a side view of the improved collapsible utility cart of the present invention, showing the container support frame members collapsibly disposed and carried by the elongated handle carrying frame members (see Arrows A and B)
Figure 3B:
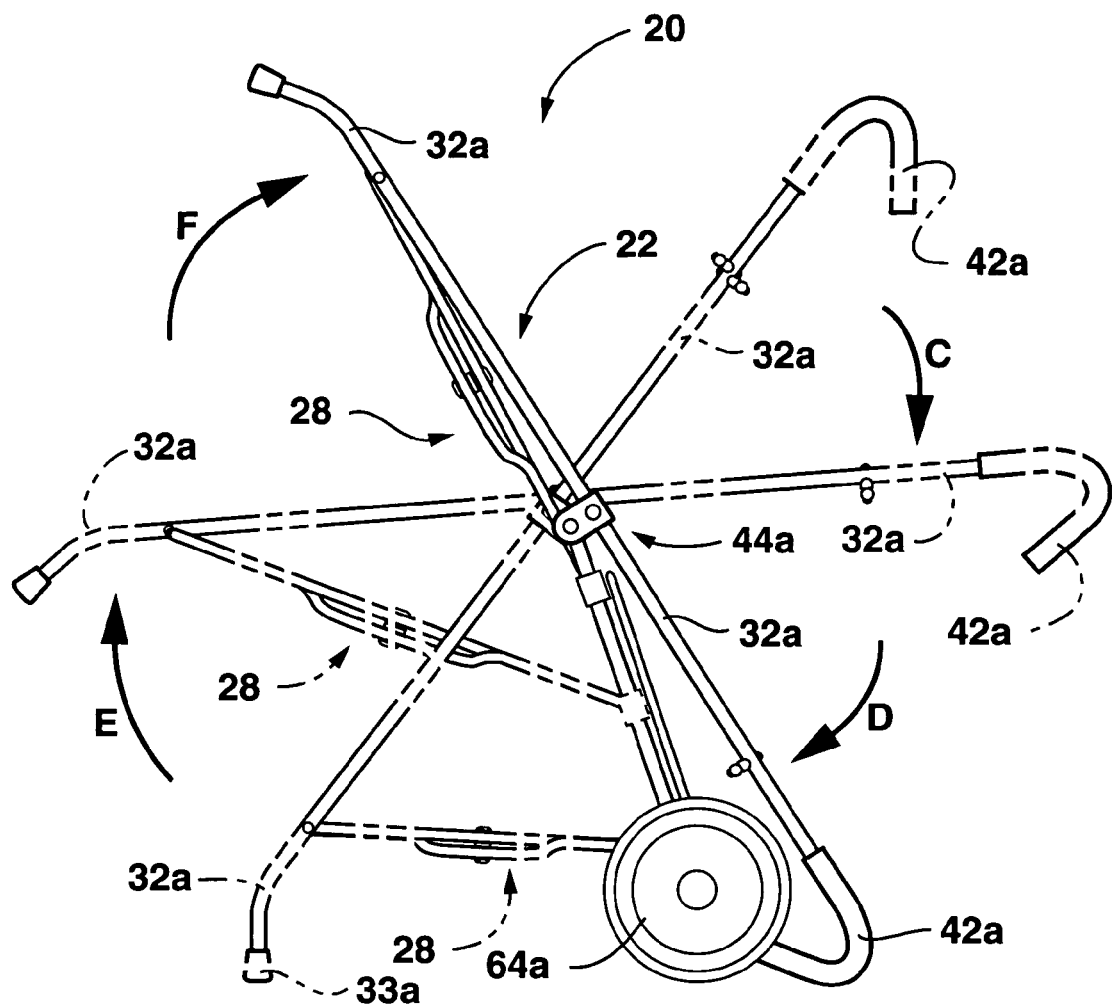
FIG. 3B is a side view of the improved collapsible utility cart of the present invention showing collapsibility thereof, and in particular illustrating the elongated handle carrying frame members moving in a clockwise direction (see Arrows C, D, E, and F)
Figure 3C:
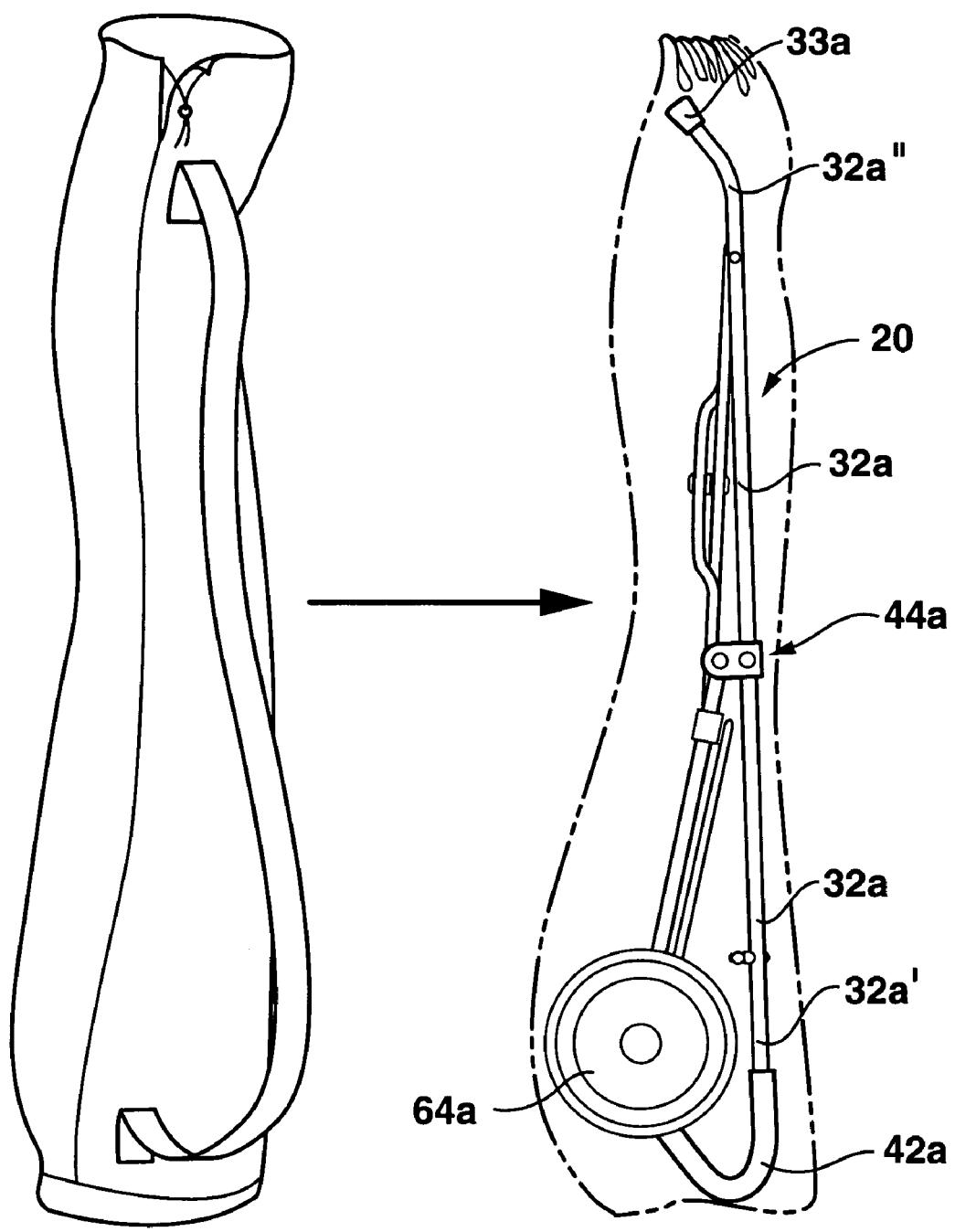
FIG. 3C is a side view of the improved collapsible utility cart of the present invention shown in fully collapsed format, and as carried within the carrying bag.
Figure 4:
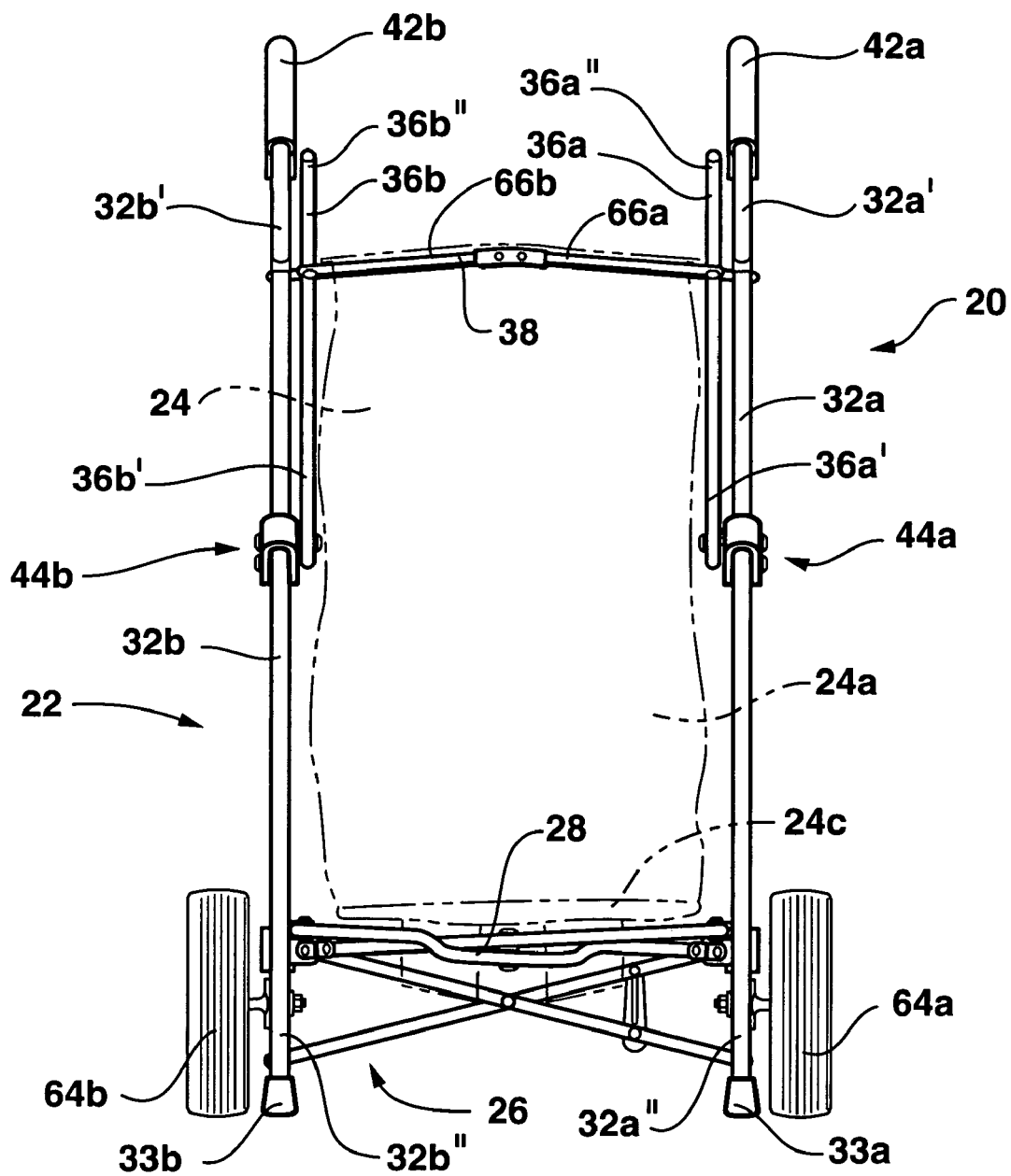
FIG. 4 is a front view of the improved collapsible utility cart of the present invention showing the frame, wheels, front stopper and handle features thereof, with the container portion shown in dotted lines, and also particularly showing the vertical and horizontal parallelogramic linkages disposed between and interconnecting the handle carrying frame members and wheel carrying members to facilitate lateral collapsibility of the utility cart.
Figure 9:
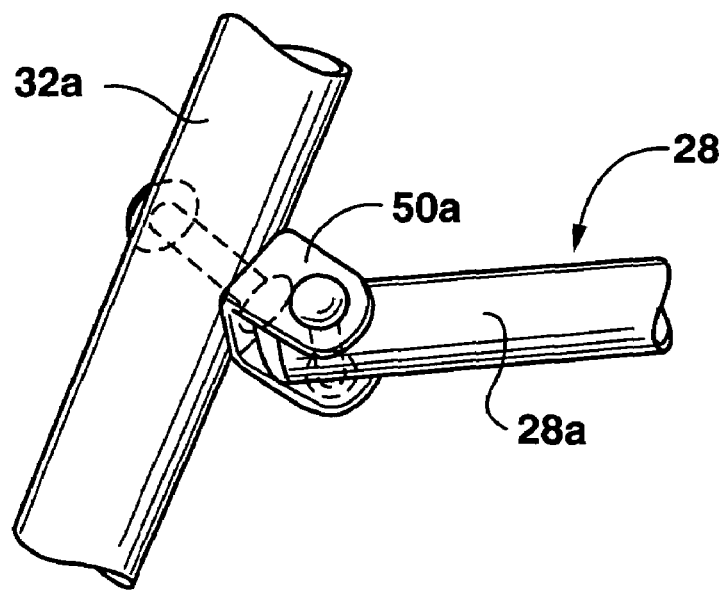
FIG. 9 is a greatly enlarged view of a rotationally and pivotally disposed connector bracket connecting the parallelogramic linkage disposed in a generally horizontal plane (as shown in FIGS. 4 and 5) with a handle connecting frame member, as detailed from FIG. 3A.

FIG. 9 depicts a preferred embodiment (also in greatly enlarged view) of one of rotationally and pivotally disposed connector bracket 50a, 50b, connecting the parallelogramic linkage 28 disposed in a horizontal plane (as shown in FIGS. 1-7) with a handle connecting frame member 32a, 32b, as detailed in FIG. 3A. The various pivotal connections between various elements of the present invention may preferably be accomplished by means of pins transversely connecting the respective parts of the frame 22. However, the present invention is not confined to particular formats of pivotal connection(s). As known in the prior art, the respective elements of the frame 22 hereof may preferably be separated by washers 52, as shown for example in FIG. 7, and which preferably may be made of a polymeric or other resilient and stable material. The respective elements of the frame 22 may in preferred embodiments preferably be made of a metallic material, which may preferably be tubular in construction, and which may also preferably be coated, such as by powder coating, electrocoating, dipping, spraying or other means with a wide variety of polymeric coatings known to those skilled in the art. The dimensions of frame 22 of the utility cart 20 hereof may vary widely in preferred embodiments.

As shown, for example, in FIGS. 10, 11, and 12, front connector generally 38, which may take various structural forms in various different embodiments. Front connector 38 is disposed between and interconnects container support frame members 36a, 36b and supports principally a front portion 24a of container 24 as carried by the frame 22.

As shown in the exemplary embodiments of FIGS. 1, 4, 5 and 13 in particular, container 24 and zippered bag 25, may in preferred embodiments be made of a fabric material, such as preferably nylon, polyester, cotton, and other fabrics, and may be in some preferred embodiments mesh-like in its structure. The preferred dimensions of container 24 may vary widely.

Figure 5:
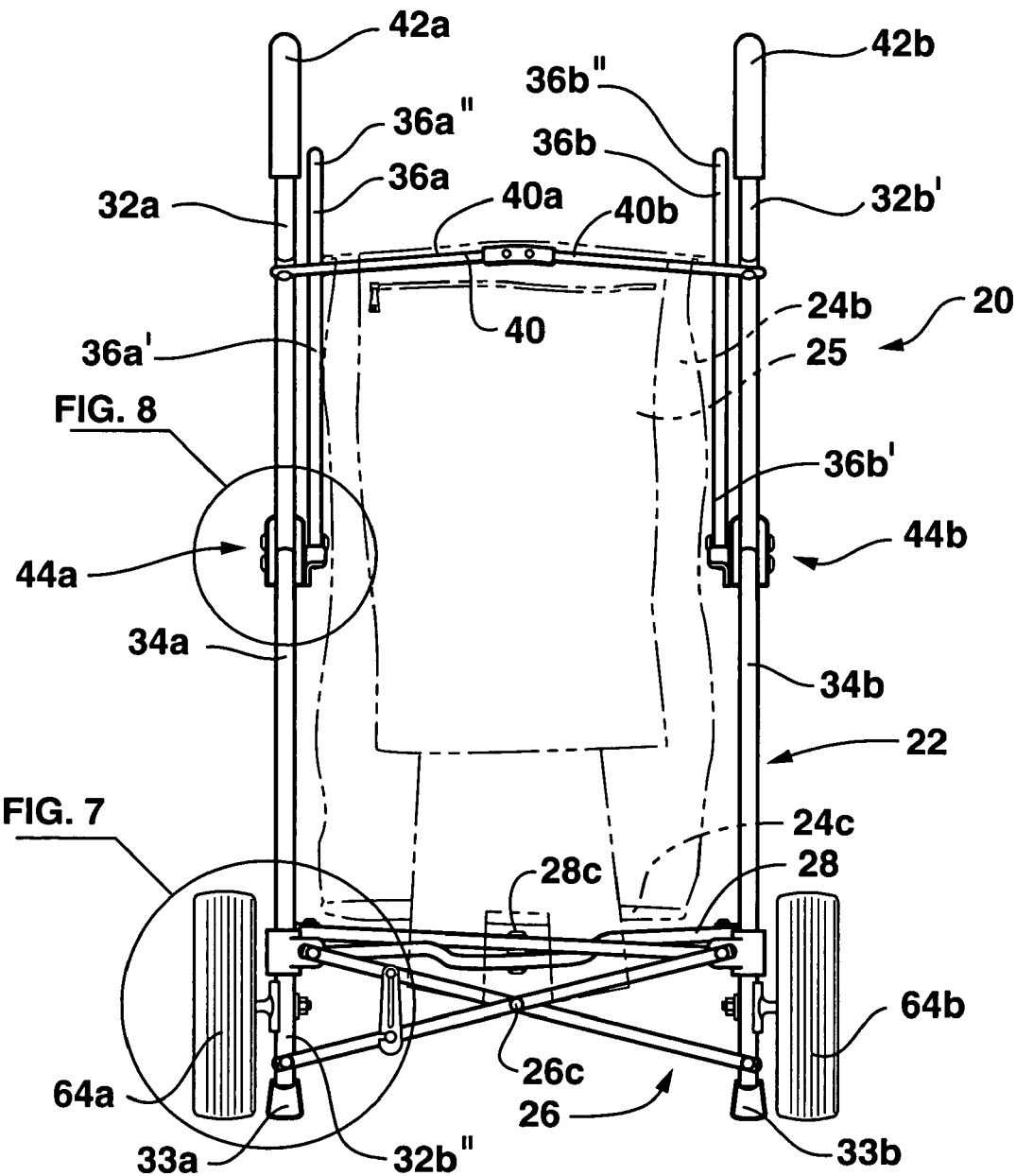
FIG. 5 is a rear view of the improved collapsible utility cart of the present invention showing the frame, wheels, front stopper and handle features thereof, with the container portion shown in dotted lines, and also particularly showing the vertical and horizontal parallelogramic linkages, together with interconnecting slidable bracket, and disposed between and interconnecting the handle carrying frame members and wheel carrying members to facilitate lateral collapsibility of the utility cart.

Rear connector 40 in preferred embodiments is disposed similarly to the embodiments of front connector 38 and as shown in FIGS. 10, 11, and 12. As such, and as shown in FIGS. 1, 2, and 5, rear connector 40 is disposed between handle carrying frame members 32a, 32b for interconnecting such handle carrying frame members 32a, 32b. Rear connector 40 functions to support principally the weight of a rear proportion 24b of the container 24, as carried by the frame 22.

Figure 6:
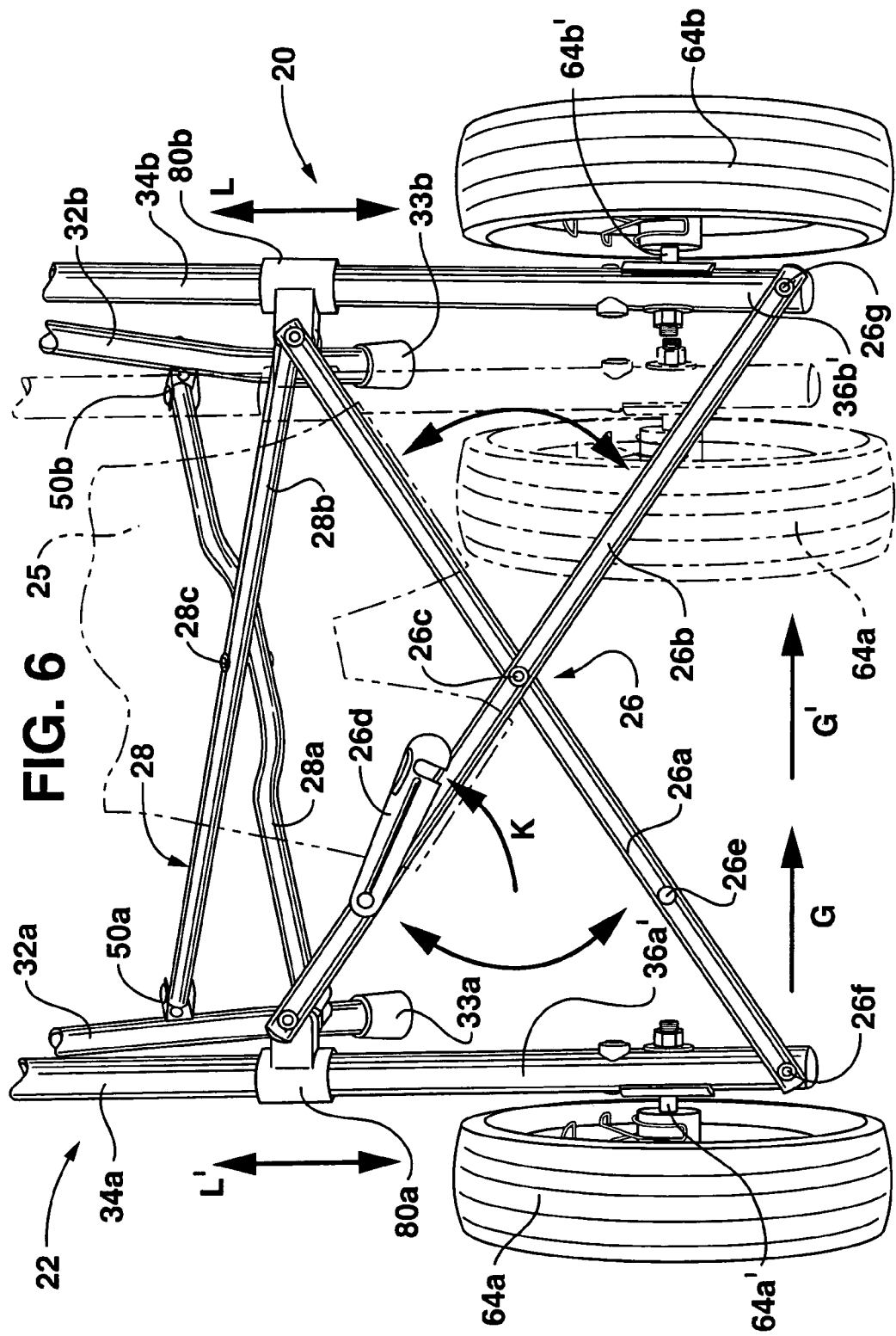
FIG. 6 is greatly enlarged rear view as taken along line 6-6 of FIG. 3A, and in particularly showing the operative collapsibility of the respective vertical and horizontal parallelogramic linkages, as interconnected by the slidable bracket, and connected to the handle carrying frame members and the wheel carrying frame members.

As shown particularly in FIGS. 1, 2, 4, 5, 6 and 7, a first parallelogramic linkage 28 is respectively connected to handle carrying frame members 32a, 32b and to wheel carrying frame members 34a, 34b. First parallelogramic linkage 28 preferably comprises linkage arms 28a, 28b (as best shown in FIG. 6), which are connected preferably in some preferred embodiments by a linkage pin 28c, and functions, inter alia, to permit collapsibility in the lateral direction (as shown at Arrows G, G') respectively of handle carrying frame members 32a, 32b and wheel carrying frame members 34a, 34b from a load carrying first position to a folded second position, as shown particularly in FIG. 3B.

As also shown in FIGS. 1, 2, 4, 5, 6, and 7, a pair of wheels 64a, 64b are disposed at distal portions 36a'', 36b'' of respective wheel carrying frame members 36a, 36b. Such wheels 64a, 64b may be of such known structure and may preferably be removably mounted, according to techniques and structures known to those skilled in the art, and, as such may preferably include respective axels 64a', 64b'.

As shown in FIGS. 1, 2, 3, 5, 6, and 7, wheel carrying frame members 34a, 34b are downwardly pivotally dependent, and forwardly facing in preferred embodiments from handle carrying frame members 32a, 32b. Accordingly, wheel carrying frame members 34a, 34b are rendered foldable in such embodiments to facilitate transportation of the improved collapsible utility cart 20 of the present invention.

In these and other preferred embodiments, members of each of the respective frame 22 elements may be unitary in structure for increased stability and rigidity. However, handle carrying frame members 32a, 32b may be hinged in certain alternative embodiments for facilitating foldability to a yet smaller dimension.

Figure 11A:
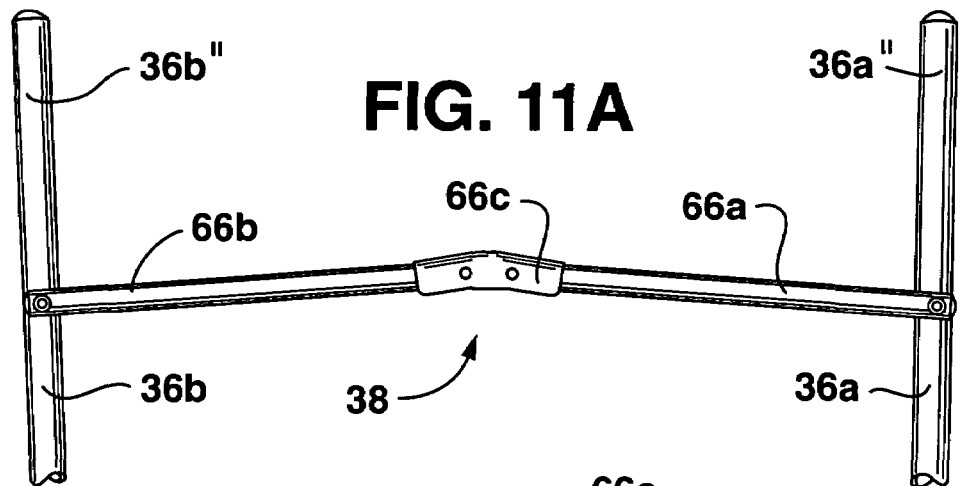
FIGS. 11A-C are operatively illustrative front views (from operative position to collapsed position, respectively) of a preferred embodiment of a front connector, and as shown in FIGS. 1 and 2 comprising a hinged cross member which permits thereby lateral collapsibility of the attached container support frame members.
Figure 11B:
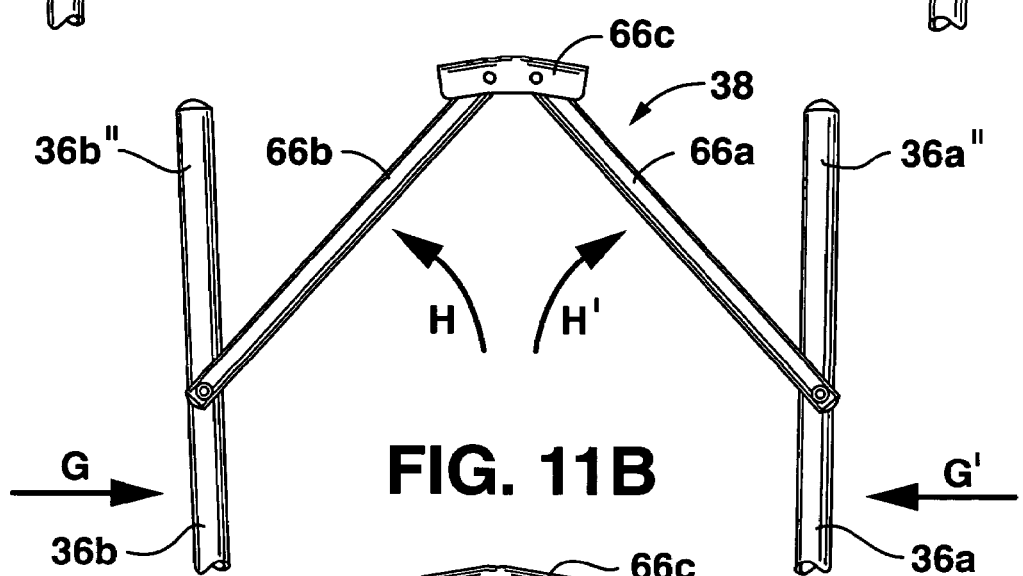
Figure 11C:
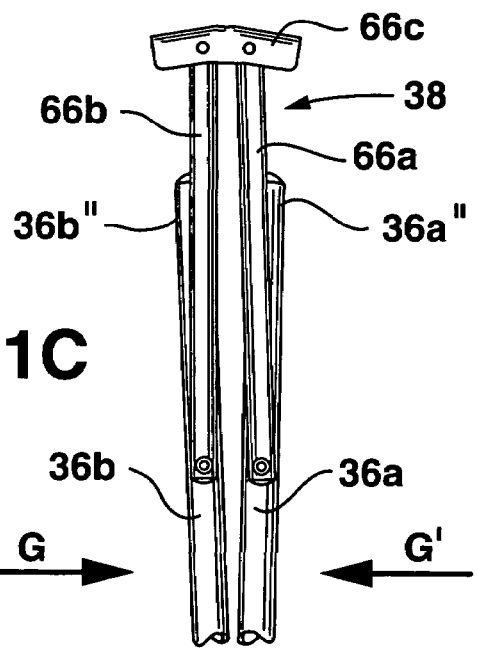

As referred to, supra, FIGS. 10, 11 and 12 show various embodiments of front connector 38, which is preferably collapsible. In particular, FIGS. 11A, 11B, and 11C show a front connector 66, which may comprise a pair of hingedly joined cross members 66a, 66b connected by hinge 66c. (See Arrows H, H'). FIGS. 11A-C are operative front views (from operative position to collapsed position) of a preferred embodiment of a front connector 66, and as shown in FIGS. 1 and 2 comprising a hinged cross member which permits lateral collapsibility of the attached container support frame members 36a, 36b.

FIG. 10A is an enlarged rear view of an alternative embodiment of a front connector 138 showing telescopingly disposed bar elements 68a, 68b, 68c thereof as disposed between the pair of container support frame members 36a, 36b. FIG. 10B is a front view of the front connector 138 showing the hingedly connected telescoping front connector 68a embodiment of FIG. 10A, and comprising transversely extending support bars 68a et seq. including a locking latch mechanism 70a, 70b thereof for holding the utility cart 20 in its fully laterally extended and operative position (See Arrow I). Accordingly, such embodiments of support bars 68a, 68b, 68c function principally to bear the weight of front portion 24a of container 24.

Figure 12A:
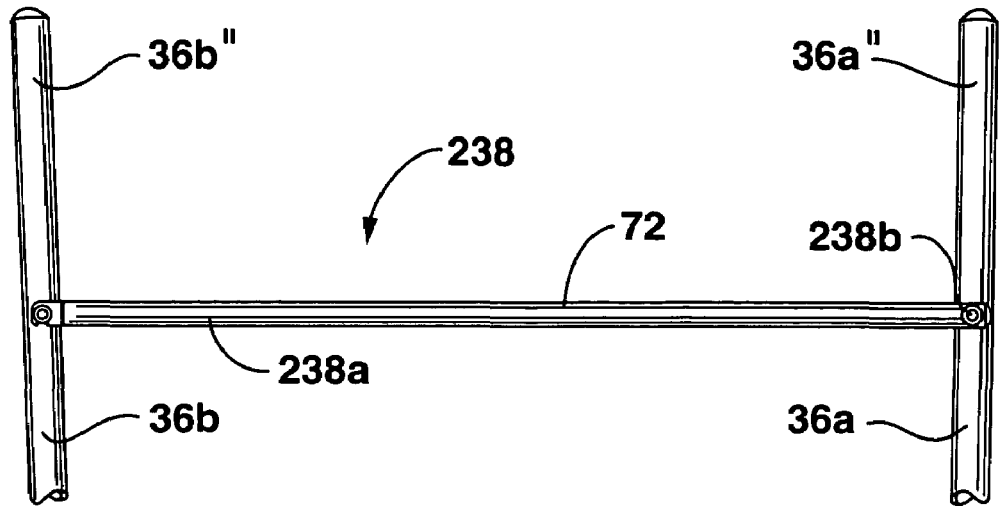
FIGS. 12A and 12B depict certain alternative embodiments of a front connector disposed between container support frame members comprising a single transversely extending support bar, which is hingedly disposed from one container support frame member and is to be securely latched to the opposite container support frame member when in the operative, laterally extended position.
Figure 12B:
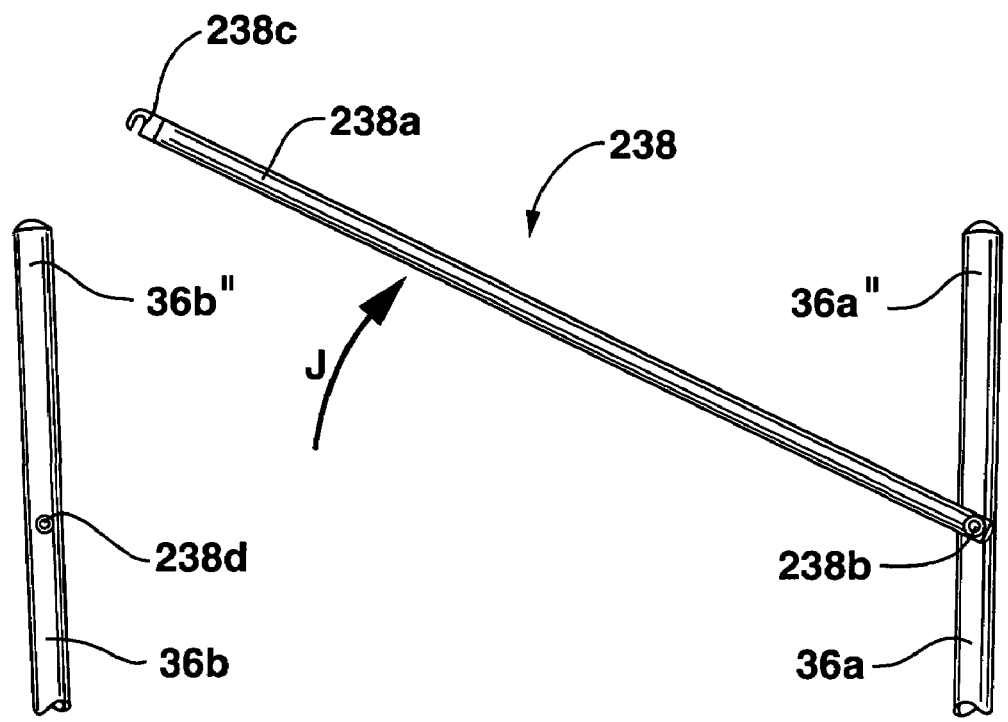

FIGS. 12A and 12B show a yet additional alternative embodiment of a front connector 238 comprising a latch-like structure comprising at least one transversely extending support bar 238a. Accordingly, FIGS. 12A and 12B depict alternative embodiments of a front connector 238 disposed between container support frame members 36a, 36b comprising a single transversely extending support bar 238a which is hingedly disposed at hinge 238b from one container support frame member 36a and is latched at latch mechanism 238c, 238d to the opposite container support frame member 36b (See Arrow J).

FIGS. 2 and 5 show various embodiments of rear connector 40, which is likewise preferably similarly collapsible. For example, in FIGS. 1 and 2, rear connector 40 comprises a pair of hingedly joined cross members 40a, 40b.

As shown in FIGS. 1, 2, 4, 5, 6 and 7, first or primary parallelogramic linkage 28 comprising linkage arms 28a, 28b is disposed horizontally to thus support the bottom portion 24c of container 24 when frame 22 has been placed in the load carrying first position, as shown in FIGS. 1 and 2.

In additionally preferred embodiments of the present invention, and as shown in FIGS. 1, 2, 3, 4, 5, 6 and 7, second parallelogramic linkage 26 comprising linkage arms 26a, 26b and connected by linkage pin 26c is disposed between and interconnects the pair of handle carrying frame members 32a, 32b substantially in the vertical dimension in preferred embodiments. This second parallelogramic linkage 26 is likewise operable from the load carrying first position to the folded second position, as shown in FIG. 6. Second parallelogramic linkage 26 is attached to wheel carrying frame members 36a, 36b near distal portions 36a", 36b", and near wheels 64a, 64b also carried by such wheel carrying frame members 36a, 36b thereof.

As shown in FIGS. 1, 2, 3, 4, 5, 6, and 7, the first parallelogramic linkage 28 further includes a locking mechanism preferably comprising a locking bar 28d and a locking pin 28e (see Arrow K in FIG. 6), although other similarly functioning locking elements are known to those skilled in the art and are to be included within the scope of the present invention.

As most clearly shown in FIGS. 6 and 7, the first and second parallelogramic linkages 28, 26 are respectively joined on both lateral sides by means of respective sliding brackets 80a, 80b slidably disposed (see Arrows L, L' in FIG. 6 and Arrow M in FIG. 7) upon the wheel carrying frame members 34a, 34b. Thus, when the vertical linkage latch 26d is disengaged (see Arrow K in FIG. 6, and Arrow N in FIG. 7) and the lateral sides of the utility cart 20 are pushed inwardly (as shown at Arrows G, G'), the vertically disposed parallelogramic linkage 26 forces the slidably disposed brackets 80a, 80b upwardly upon the respective wheel carrying frame members 34a, 34b (as shown at Arrows L, L') and the internal angles between the cross-members 26a, 26b of the vertically disposed parallelogramic linkage 26 increase to move the lateral sides of the utility cart into closer proximity (as shown at Arrows R, R', S and S' in FIG. 7). This opening movement of the respective cross-members of the vertically disposed parallelogramic linkage 26 is further facilitated by means of the mounting of the respective ends of the respective cross-members 26a, 26b of the vertically disposed parallelogramic linkages 26 upon pins 26f, 26g to permit partial rotational movement as shown at Arrows O, O. As the slidable brackets 80a, 80b are slid upwardly on the wheel carrying frame members 34a, 34b, the horizontally disposed parallelogramic linkage 28 collapses by means of a similar mechanism to reduce substantially the over-all lateral dimension of the utility cart 20 of the present invention. Specifically, the horizontally disposed parallelogramic linkage cross-members 28a, 28b are collapsed toward each other to lengthen the over-all dimension of the horizontally disposed parallelogramic linkage 28 in the direction transverse to the wheel axles 64a', 64b', and which is facilitated by means of a rotational connector 80c as mounted to the slidable bracket 80a and shown in FIG. 7 (See Arrows P, P' and Q in FIG. 7).

Yet additionally, the handle carrying frame members 32a, 32b also may preferably carry a pair of end pieces 33a, 33b at respective distal end portions 32a", 32b" thereof. Such end pieces 33a, 33b may act as stopper elements for the cart 20, and may preferably be formed from a polymeric or other soft, resilient and stable material.

While the invention hereof has been described with reference to at least certain preferred and/or alternative embodiments, it is to be understood by those skilled in the art that the present invention is not materially or unnecessarily limited with regard to these exemplary descriptions.

What is claimed is:

1. An improved collapsible utility cart, comprising:
    a frame and a container, said container having front, rear and bottom portions and carried by said frame, said frame having;
    a pair of oppositely disposed, interconnected, elongated handle carrying frame members, each having proximal and distal portions thereof, said proximal portion including a proximal end which is adapted to include a handle;
    a pair of oppositely disposed wheel carrying frame members, which are respectively pivotally dependent from said handle carrying frame members, and having proximal and distal portions thereof;
    a pair of interconnected and oppositely disposed container support frame members, each of which pivotally depends from a respective said handle carrying frame member, and having proximal and distal portions thereof;
    a front connector disposed between said container support frame members for interconnecting said container support frame members and for supporting the weight of at least a front portion of said container carried by said frame;
    a rear connector disposed between said handle carrying frame members for interconnecting said handle carrying frame members and for supporting the weight of at least a rear portion of said container carried by said frame;
    a first parallelogramic linkage respectively connected to said handle carrying frame members and to said wheel carrying frame members to permit collapsible lateral movement respectively of said handle carrying frame members and said wheel carrying frame members from a load carrying first position to a folded second position to reduce the width of said frame, wherein said first parallelogramic linkage is disposed in a substantially horizontal plane; and,
    a pair of wheels carried by and supporting said frame, disposed at a distal portion of each of said respective wheel carrying frame members.

2. The improved collapsible utility cart of claim 1 wherein said pair of wheels carryng frame members are respectively disposed in a forwardly direction.

3. The improved collapsible utility cart of claim 1 wherein said frame members are tubular.

4. The improved collapsible utility cart of claim 1 wherein said frame is metallic.

5. The improved collapsible utility cart of claim 1 wherein said frame members are coated.

6. The improved collapsible utility cart of claim 5, wherein said coating comprises a polymeric material.

7. The improved collapsible utility cart of claim 1 wherein said wheel carrying frame members are downwardly pivotally dependent from said handle carrying frame members.

8. The improved collapsible utility cart of claim 4 wherein said wheel carrying frame members are rearwardly pivotally dependent from said handle carrying frame members.

9. The improved collapsible utility cart of claim 1 wherein said container support frame members pivotally depend from said handle carrying frame member for disposition.

10. The improved collapsible utility cart of claim 1 wherein said front connector is collapsible.

11. The improved collapsible utility cart of claim 10 wherein said front connector comprises a hinged cross member.

12. The improved collapsible utility cart of claim 10 wherein a pair of transversely extending container support bars are provided and are respectively telescopeably disposed to form a substantially continuous inward container support bar for bearing the weight of said front portion of said container.

13. The improved collapsible utility cart of claim 1 wherein said front connector comprises at least one transversely extending support bar.

14. The improved collapsible utility cart of claim 1 wherein said front connector comprises a transversely extending support bar which is hingeably disposed at a first end from one of said container support frame members at a first end and further includes a locking latch at the opposite end thereof for securement to the oppositely disposed container support frame member.

15. The improved collapsible utility cart of claim 1 wherein said rear connector is collapsible.

16. The improved collapsible utility cart of claim 15 wherein said rear connector comprises a hinged cross member.

17. The improved collapsible utility cart of claim 1 wherein said rear connector comprises at least one transversely extending support bar.

18. The improved collapsible utility cart of claim 1 wherein said rear connector comprises a transversely extending support bar which is hingeably disposed at a first end from one of said handle carrying frame members at a first end and further includes a locking latch at the opposite end thereof for securement to the oppositely disposed handle carrying frame member.

19. The improved collapsible utility cart of claim 15 wherein a pair of transversely extending container support bars are provided and are respectively telescopeably disposed to form a substantially continuous inward container support bar for bearing the weight of said rear portion of said container.

20. The improved collapsible utility cart of claim 1 wherein said first parallelogramic linkage is disposed to support at least said bottom portion of said container when said frame is disposed in said load carrying first position.

21. The improved collapsible utility cart of claim 1 further comprising a second parallelogramic linkage disposed between and interconnecting said pair of wheel carrying frame members.

22. The improved collapsible utility cart of claim 21, wherein said second parallelogramic linkage is disposed in a substantially vertical plane.

23. The improved collapsible utility cart of claim 21 wherein said second parallelogramic linkage disposed between and interconnecting said pair of wheel carrying frame members is operable from said load carrying first position to said folded second position.

24. The improved collapsible utility cart of claim 21 wherein said second parallelogramic linkage is attached to each of said wheel carrying frame members at distal portions thereof.

25. The improved collapsible utility cart of claim 1 wherein said pair of wheel carrying frame members are respectively pivotally connected at proximal portions thereof to said handle carrying frame members.

26. The improved collapsible utility cart of claim 1 wherein said pair of container support frame members are each respectively pivotally connected at proximal portions thereof to said handle carrying frame members.

27. The improved collapsible utility cart of claim 1 wherein said front connector is disposed between said container support frame members at respective distal portions of said respective container support frame members.

28. The improved collapsible utility cart of claim 21 further comprising locking means disposed upon said second parallelogramic linkage for locking said second parallel linkage when in said load carrying first position.

29. The improved collapsible utility cart of claim 1 further comprising a pair of end pieces disposed upon said each of said handle carrying frame members for stopping said utility cart.

30. The improved collapsible utility cart of claim 29 wherein said end pieces are disposed upon said pair of handle carrying frame members at respective distal portions thereof.

31. The improved collapsible utility cart of claim 1 wherein said wheels are removably mounted.

32. The improved collapsible utility cart of claim 1 wherein each of said pair of container support frame members pivotally depend from a generally middle portion of said respective handle carrying frame members.

33. The improved collapsible utility cart of claim 1 wherein each of said pair of wheel carring frame members pivotally depend from a generally middle portion of said respective handle carrying frame members.

34. The improved collapsible utility cart of claim 1 wherein said front connector and said rear connector are disposed generally within a plane.

35. The improved collapsible utility cart of claim 34 wherein said plane of front and rear connectors is generally horizontal in disposition when said frame is disposed into said load carrying position.

36. The improved collapsible utility cart of claim 1 further comprising a pair of handles disposed at said proximal portion of each of said handle carrying frame members.

37. The improved collapsible utility cart of claim 36 wherein said handles comprise respective sleeves disposed over said proximal end of said handle carrying frame member.

38. The improved collapsible utility cart of claim 36 wherein said handles comprise a polymeric material.

39. The improved collapsible utility cart of claim 1 wherein said handle carrying frame members are substantially parallelly disposed.

40. The improved collapsible utility cart of claim 1 wherein said container is substantially elongated in shape and extends generally vertically from said front and rear connectors to said first parallelogramic linkage.

* * * * *